UNITED STATES PATENT OFFICE.

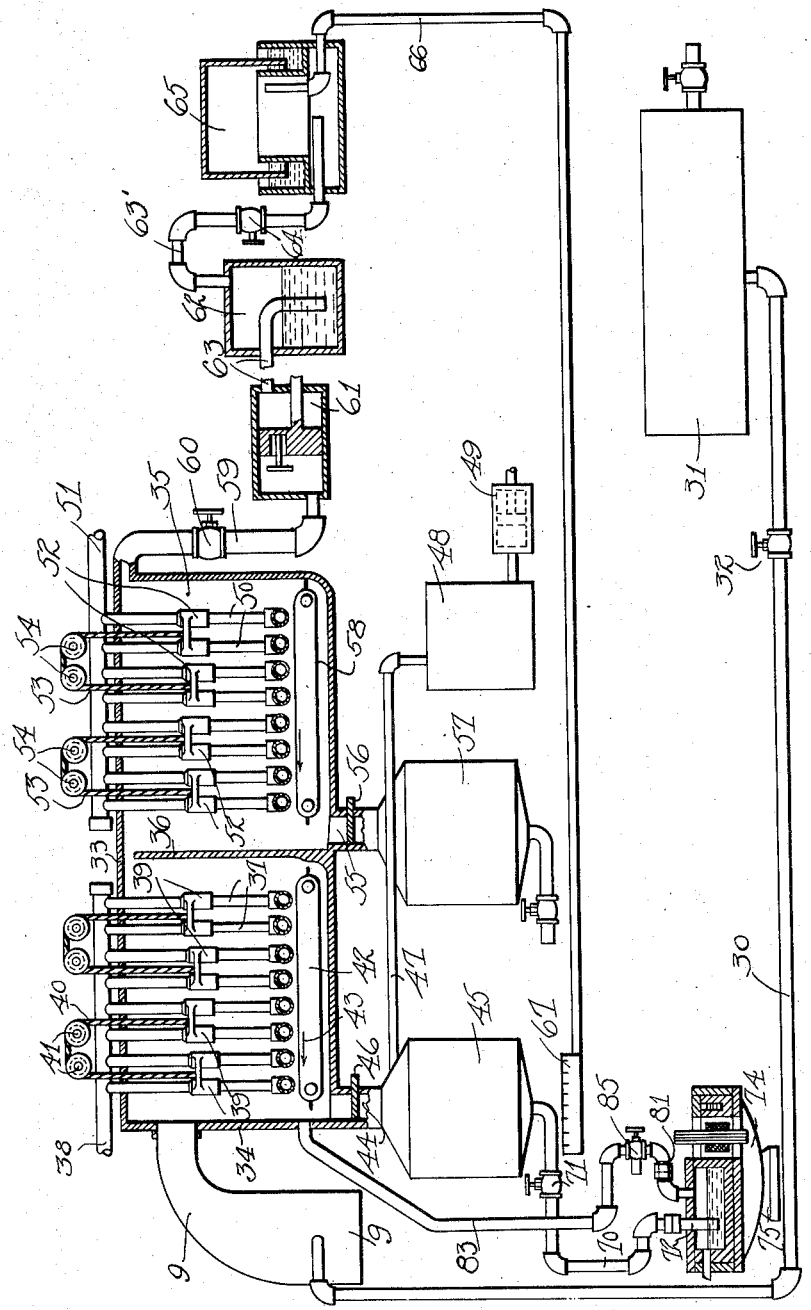

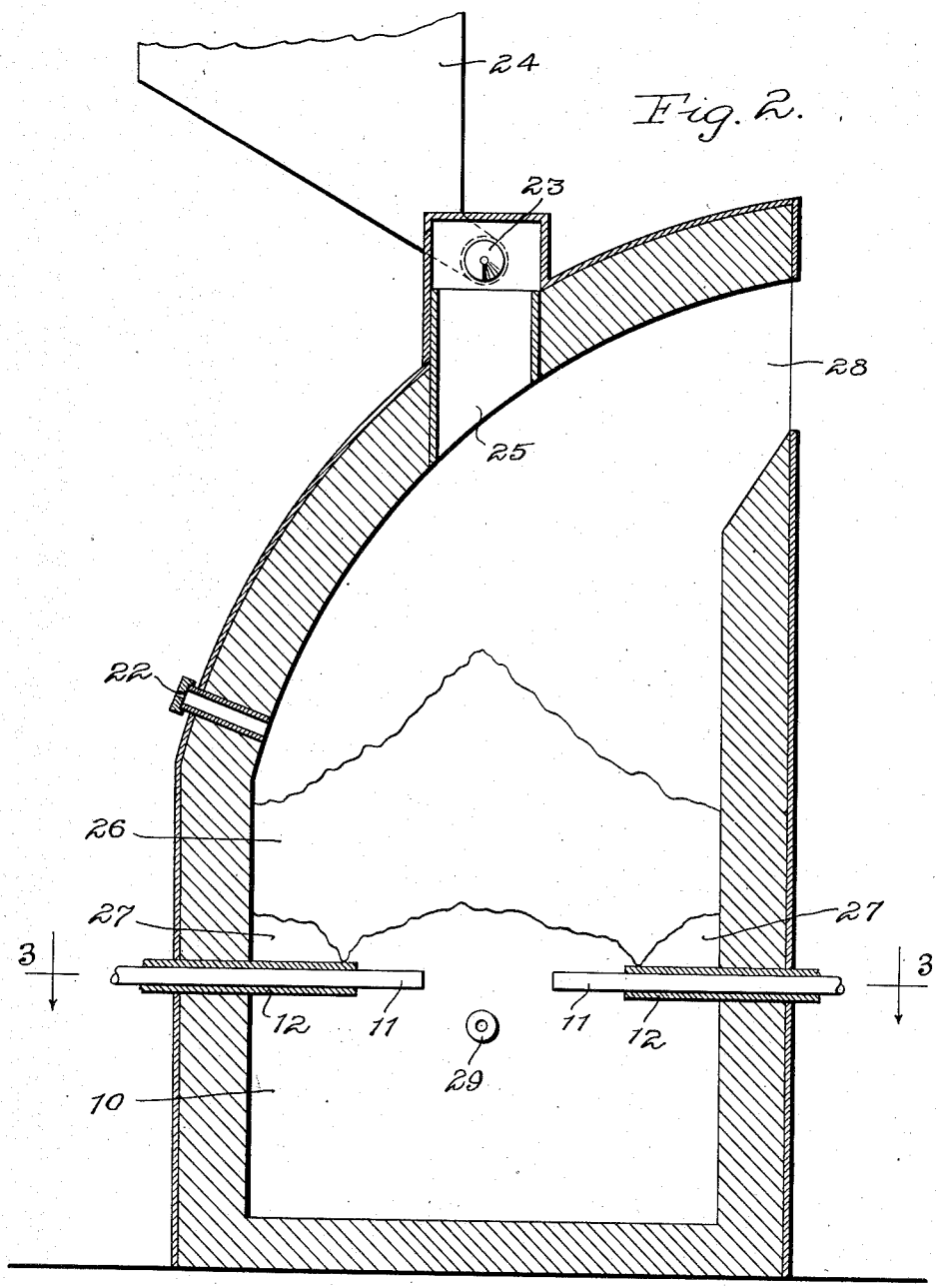

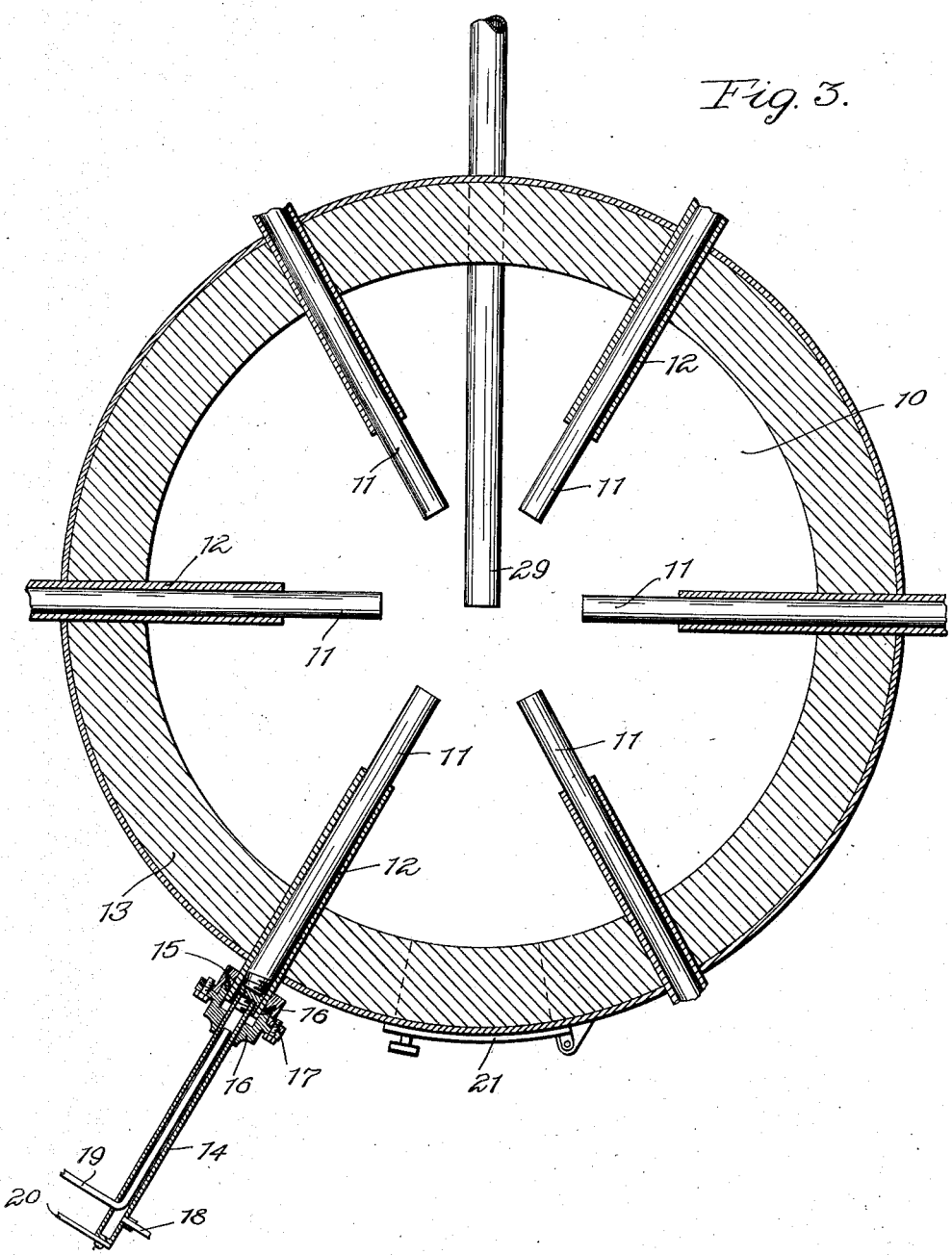

VICTOR M. WEAVER, OF HARRISBURG, PENNSYLVANIA, ASSIGNOR TO WEAVER COMPANY, A CORPORATION OF WISCONSIN.

PROCESS OF PRODUCING AND SEPARATING CERTAIN SUBSTANCES.

1,300,205.    Specification of Letters Patent.    Patented Apr. 8, 1919.

Original application filed August 22, 1914, Serial No. 858,001. Divided and this application filed January 7, 1915. Serial No. 919.

*To all whom it may concern:*

Be it known that I, VICTOR M. WEAVER, a citizen of the United States, residing at Harrisburg, in the county of Dauphin and State of Pennsylvania, have invented a certain new and useful Improvement in Processes of Producing and Separating Certain Substances, of which the following is a full, clear, concise, and exact description, reference being had to the accompanying drawings, forming a part of this specification.

My invention relates to a process of producing and separating substances of certain quality, and while it will appear to those skilled in the art that my invention may be employed in the treatment of any substances, either compounds or mixtures having the proper chemical and physical characteristics, my invention is concerned particularly with the treatment of substances containing at least one metal and oxygen and, in its more specific aspects with the production and separation of aluminum chlorid and silicon tetrachlorid, due to their special properties and those of the charge as pointed out in the more specific of the appended claims.

The application is divisional from the application which resulted in my Patent Number 1,238,604 dated August 28, 1917, which is concerned with a process of winning desired substances from mixtures and compounds in which they appear and which, for example and in its more specific aspects, relates to the treatment of clay or some similar material in order to secure the aluminum and the silicon therefrom. The claims in the parent application are drawn toward the process as a whole, that is, for example, the claiming of the complete process beginning with clay or some similar material, such as bauxite and the proper reagents and ending with the recovery of the aluminum and silicon in their elementary states without limitation to the particular manner in which each of the steps is carried out, except where such particular manner influences or is influenced by any or all of the other steps.

The present application has to do with the novel and advantageous manner, according to my invention, in which a plurality of substances are prepared and separated, in its more specific aspect being concerned with the preparation of aluminum chlorid and silicon tetrachlorid from clay or some similar material and proper reagents and with the separation of these two chlorids.

I shall now proceed with a specific description of my invention as embodied in my process of producing separately aluminum chlorid and silicon tetrachlorid from clay, and I shall refer to and describe the various parts of the apparatus and the various stages in the process in detail, in order to instruct those skilled in the art.

According to my invention I break up the clay by the use of chlorin gas so as to produce simultaneously aluminum chlorid and silicon tetrachlorid, this action being carried on under special restrictions and conditions, as will later be more fully described. I then subject the chlorids which I thus form to condensing temperatures, whereby the two chlorids are separated and may thereafter be independently treated.

My invention will be more readily understood by reference to the accompanying drawings, in which Figure 1 is a more or less diagrammatic representation of the system of apparatus;

Fig. 2 is a vertical sectional view of the chlorinizing furnace;

Fig. 3 is a horizontal sectional view of the chlorinizing furnace taken on the plane of the line 3—3 of Fig. 2 and looking in the direction indicated by the arrows.

Referring first to Fig. 1, it will be seen that the chlorinizing furnace is shown at 9, and by reference to Figs. 2 and 3 it will be seen that this chlorinizing furnace is of the closed type and provides for a bed of coke 10, in which a plurality of electrodes 11—11, extending inwardly through the circular housing, as illustrated in Fig. 3, are lodged. Each of the carbon electrodes 11 is firmly mounted in a terra cotta pipe 12, which in turn is mounted in the fire brick housing 13. An electric conductor 14 is provided for each of the carbon electrodes and this conductor is in the form of a pipe which is connected with the electrode at 15 and which is supported in position by means of a union 16 packed at 17. The pipe 14 is kept cool by a flow of water introduced through the entry pipe 18, and, after circulation, passed through the return pipe 19. The usual insulated electric conductor 20 may be attached to the end of the pipe 14, as illustrated, and at this distance from the furnace housing the conductor and its insulation will not be injuriously affected by the heat. The reference character 21 indicates a cleanout door which may be provided, and a peep hole arrangement 22 may also be provided.

The charge is introduced into the chlorinizing furnace by way of a screw conveyer, indicated at 23 at the bottom of a hopper bin 24, this screw conveyer leading the charge to the passage 25, through which the charge may drop on to the bed of coke which has already been referred to.

The charge is indicated at 26 and the bed is preferably so arranged that the coke exposed in the middle is surrounded by packed clay, as illustrated at 27, 27. The charge may be any clay but I have found that the higher grades of clay, such as kaolin, of the formula $Al_4(SiO_4)_3$—(the moisture being driven therefrom) is especially desirable. It will be noted that the furnace has only the outlet 28 and it will be noted as this description proceeds that the entire system is closed as this furnace is. It will be noted that a graphite pipe 29 extends through the fire brick housing of the furnace and terminates in the heart of the coke bed. This pipe 29 is fed through a pipe 30 (Fig. 1) from a storage tank 31, the connection being controlled by a valve 32. It will now be noted that with the chlorin properly fed to the graphite pipe and with the current properly applied to the electrodes the activity of the chlorin gas and the heat immediately effects the disintegration of the kaolin, the formation of aluminum chlorid and silicon tetrachlorid, and, by the combination of the carbon and the oxygen liberated from the kaolin, the formation of carbon monoxid. So far as the degree of heat is concerned, those skilled in the art will, of course, be guided by the fact that such a degree of heat as effects reaction between the chlorin and the aluminum and silicon is required, the effective temperatures being well known in the art. I might add, for what further assistance it may give, that I have found that temperatures between 900° and 1200° centigrade are most efficient.

The reaction is as follows:

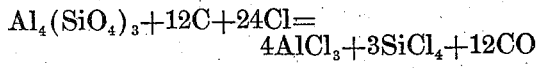

$$Al_4(SiO_4)_3 + 12C + 24Cl = 4AlCl_3 + 3SiCl_4 + 12CO$$

The three gases thus formed naturally rise and pass out of the outlet opening 28, and, as illustrated in Fig. 1, are conducted to the condenser 33. This condenser is in the form of a double closed chamber providing the compartment 34 and the compartment 35 separated by a partition 36. The compartment 34 is provided with a system of cooling pipes 37, 37, which extend downwardly through and from the top of the chamber and which are distributed throughout the entire space of this particular compartment in order to get complete temperature control. The pipes 37, 37 are joined at the upper ends outside of the chamber by means of the header pipe 38 and circulation is secured in any desirable manner. In this particular condenser element the system of pipes is connected to a cold water supply and the result is that as the three gases which have been referred to enter and pass through the compartment 34 the aluminum chlorid gas, which condenses at a higher temperature than the silicon tetrachlorid gas, is condensed and deposits itself as a white powder upon the pipes 37, 37. It might be mentioned here that it is possible that in the action in the chlorinizing furnace some other chlorid of silicon might incidentally be formed, a chlorid such as hexachlorid ($Si_2Cl_6$), but I find that conditions are such that it is only the silicon tetrachlorid which plays any considerable part.

Since the temperature which is produced by the circulation of mere cold water in the cooling pipes 37, 37 is not sufficiently low to condense silicon tetrachlorid, this gas, together with the carbon monoxid, passes on to the next compartment 35 of the condenser. Thus the first condenser element 34 is devoted to the condensation of the aluminum chlorid and the white powder to which it is reduced is removed from the pipes upon which it is deposited by means of the scrapers 39, 39, which by means of pulley cords 40 passing over suitable pulleys 41, 41 on the outside of the condenser are drawn up and down on the pipes to scrape them, in an obvious manner. The powder is thus thrown down on to the conveyer 42, the upper run of which passes in the direction of the arrow 43, and thus the condensed aluminum chlorid is brought to the end of the condenser element where the outlet 44 leading to a tank 45 is provided. This outlet may be controlled by a valve 46. It will be noted that this tank is connected by means of a pipe 47 with a compressed air tank 48, which is fed through the air compressor 49. It is important, as before indicated, that the system be a closed system and that various actions be carried on under pressure, and I speak of it particularly at this time because of the fact that the aluminum chlorid to which I have just referred is extremely deliquescent and must be kept free from moisture in order to avoid decomposition and the formation of hydrochloric acid. When the system is closed, however, such a result is not possible, and the pressure has a purpose to be referred to later.

Leaving the aluminum chlorid, which has been deposited in the tank 45, for the present, I shall follow the course of the silicon tetrachlorid gas and the carbon monoxid through the second element of the condenser. The condenser element 35 is provided with a system of cooling pipes 50 like the pipes 37, these pipes having the outside header 51 and being provided with the scrapers 52, 52 hung from the pulley cords 53, 53, passing over the pulleys 54, 54. Instead of being supplied with mere cold-water, however, the cooling pipes 50 are supplied with a freezing mixture of ice water and salt, and the temperature in the condenser element 35 is therefore considerably lower than the temperature in the condenser element 34. The lower temperature is sufficient to condense the silicon tetrachlorid which comes down as a colorless liquid, except for any impurities which may discolor it. This liquid silicon tetrachlorid passes down the sloping bottom of the condenser element 35 and passes through the outlet 55. The condenser element 35 is provided with scrapers as the condenser element 34 is, because it is possible that the aluminum chlorid not entirely condensed in its passage through the condenser element 34 may condense upon the pipes 50 of the condenser element 35, and it is therefore desirable to periodically operate the scrapers 52 in order to remove this condensation. The scrapers 39 of the other condenser element are operated during all the time that the system is being worked. The condenser element 35 is provided with a conveyer 58.

The carbon monoxid passes out of the condenser element 35 through a pipe 59, past a valve 60 and to a closed gas pump 61, and is then carried to a scrubber 62 by means of a pipe 63, this scrubber being in the form of a tank containing lime water and having an outlet pipe 63' leading therefrom. This outlet pipe is provided with a valve 64 and leads to a telescoping gas tank 65 so that pressure may be kept upon the carbon monoxid which finds its way to this tank and so that the carbon monoxid may be fed by way of a pipe 66 to a burner 67 which is used for heating the tank 45 for a purpose to which I shall now refer.

Returning now to the aluminum chlorid condenser deposited in the form of a powder in the tank 45 (this powder being white unless discolored by impurities), it will be noted that I have placed the burner 67 under this tank, and I may mention here that I surround the tank in practice with a suitable fire wall, so that I can subject the tank to a high degree of heat. With the valve 46 closed, the material in the tank 45 can be placed under high pressure from the tank 48, and this pressure, together with the heat from the carbon monoxid burner melts the aluminum chlorid, after which step the aluminum chlorid is much more stable and much more easily handled, due to its physical condition. I desire to state, however, that it is entirely feasible to care for the aluminum chlorid in its powder condition.

A pipe 70 leads from the tank 45 to a valve 71, which in turn is connected with a pipe 72 leading into a furnace, preferably of the Rodenhauser three-phase type. This furnace comprises a heavy outer housing 73, which is provided with a round bottom 74 mounted in a correspondingly shaped base 75, the idea being that when the connecting pipes are temporarily detached the furnace can be tilted in order to tap off molten metal, as will be pointed out a little later. The furnace provides a cavity for the molten metal. The details of this furnace do not constitute part of my present invention, but I refer to them because it is a type of furnace well adapted for use as part of my system. It will be seen that when the valve 71 is opened the liquid aluminum chlorid is conducted to the working chamber of the Rodenhauser furnace. The reason for this step in the process is as follows:

In the first condensation of the aluminum chlorid in the condenser element 34 there are likely to be impurities, principally iron, and it is the object of the step in the process now under description to eliminate this iron and to secure pure aluminum chlorid. Therefore, preliminarily, the Rodenhauser furnace is charged with aluminum and the molten bath, as illustrated, is formed, when, as before stated, the valve 71 is opened and the liquid aluminum chlorid is fed into this bath of molten aluminum near the bottom thereof, the aluminum chlorid is immediately reconverted into a gas due to the release of pressure and heat of bath and passes up through the molten aluminum. Due to the greater affinity of the chlorin for the aluminum than for the iron, or other impurity for that matter, the chlorid releases the iron and takes on the proper share of aluminum. The result is that the refined aluminum chlorid will leave the bath of aluminum and will pass out of the furnace through the pipe 81 and pipe 83 back to the condenser, where it will be returned to its powder condition. The three-way valve 85 may be provided so that if desired the purified aluminum chlorid may be led to a separate condenser, so that the first condenser may operate continuously and without the introduction of purified aluminum chlorid gas. It will also appear that if some of the silicon tetrachlorid should happen to become condensed in the aluminum chlorid part of the condenser system, such condensed silicon tetrachlorid will be removed with the impurities in the Rodenhauser furnace since the aluminum has greater affinity for chlorin than silicon and the chlorin will release the silicon and take up the proportionate share of aluminum, leaving the silicon to be tapped off with the impurities.

It will be seen that the system is a closed system and that moisture is effectively excluded so as to protect the active chlorids, particularly the aluminum chlorids.

In charging the chlorinizing furnace it is good practice to mix calcined clay and coke breeze to the right proportions before feeding it to the furnace and to drop the mixture through the roof. I also use a deep fire and run the pile at a white heat.

I desire to call attention to the fact that it is possible to treat the clay with chlorin in some other way than to feed the chlorin gas to the chlorinizing furnace, as has been described. I contemplate the use of compounds of chlorin to secure reactions, in order to produce the chlorids. For instance, I might use carbon tetrachlorid (which may be produced by passing chlorin through a glowing bed of coke) and feed this carbon tetrachlorid, which is a colorless mobile liquid, into the chlorinizing furnace with the clay or carbon, or into the mixture of clay and carbon already fed into the furnace.

I claim as new and desire to secure by Letters Patent:

1. The process of separating aluminum chlorid and silicon tetrachlorid which comprises submitting the mixture to a moisture free atmosphere which will condense the former but not the latter.

2. The process of separating aluminum chlorid and silicon tetrachlorid which comprises submitting the mixture to a temperature above the freezing point of water to condense the aluminum chlorid and then submitting the remaining gas to the freezing temperature of water to condense the silicon tetrachlorid.

3. The process which comprises treating clay with chlorin in the presence of carbon in a moisture free atmosphere to form aluminum chlorid, silicon tetrachlorid and carbon monoxid, and then separating the two chlorids by a difference in temperature.

4. The process of treating clay with chlorin in a moisture free atmosphere to form aluminum chlorid and silicon tetrachlorid, and then separating the two chlorids by a difference in temperature.

5. The process of treating clay with chlorin in a moisture free atmosphere to form aluminum chlorid and silicon tetrachlorid, and then separating the two chlorids in a moisture free atmosphere by a difference in temperature.

6. The process which comprises treating clay with chlorin in the presence of fixed carbon to form aluminum chlorid, silicon tetrachlorid and carbon monoxid, and then separating the two chlorids by a difference in temperature.

7. The process which comprises treating a substance containing aluminum and silicon with chlorin to form aluminum chlorid and silicon tetrachlorid, and then separating the two chlorids in a moisture free atmosphere by a difference of temperature.

8. The process which comprises treating a substance containing aluminum and silicon with chlorin in a moisture free atmosphere to form aluminum chlorid and silicon tetrachlorid, and then separating the two chlorids in a moisture free atmosphere by a difference of temperature.

9. The process which comprises treating a substance containing silicon with a halogen to form a compound between the halogen and the silicon, and then condensing the gaseous compound thus formed in a moisture free atmosphere.

10. The process which comprises treating clay with chlorin in the presence of a reducing agent and in a moisture free atmosphere to form aluminum chlorid, silicon tetrachlorid and a compound of said reducing agent and oxygen, and then separating the two chlorids by a difference in temperature.

11. The process which comprises treating a continuously fed charge with a continuously fed gas to form continuously a mixture of gaseous compounds, and then separating said gaseous compounds by fractional condensation at the same rate at which they are formed.

12. The process which comprises treating a continuously fed charge of material containing aluminum and silicon and oxygen with a continuous feed of chlorin and a reducing agent to form aluminum chlorid, silicon tetrachlorid and a compound between said reducing agent and the oxygen, and continuously submitting the gaseous mixture thus formed to an atmosphere which will condense the aluminum chlorid but not the silicon tetrachlorid of said compound.

13. The process of separating aluminum chlorid and silicon tetra-chlorid which comprises submitting the mixture to an atmosphere which will condense one but not the other under such conditions as to prevent moisture affecting them.

In witness whereof, I hereunto subscribe my name this 4th day of January A. D. 1915.

VICTOR M. WEAVER.

Witnesses:
EDWARD J. DUNLAP,
NOAH S. HEISEY.